US008140508B2

(12) United States Patent
Chi (10) Patent No.: US 8,140,508 B2
(45) Date of Patent: Mar. 20, 2012

(54) SYSTEM AND METHOD FOR CONTEXTUAL COMMANDS IN A SEARCH RESULTS PAGE

(75) Inventor: Liang-Yu Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 432 days.

(21) Appl. No.: 11/863,388

(22) Filed: Sep. 28, 2007

(65) Prior Publication Data
US 2009/0089245 A1 Apr. 2, 2009

(51) Int. Cl.
*G06F 17/30* (2006.01)
(52) U.S. Cl. ....................................... 707/706
(58) Field of Classification Search .................. None
See application file for complete search history.

(56) References Cited

U.S. PATENT DOCUMENTS

| | | | | |
|---|---|---|---|---|
| 2005/0120003 A1* | 6/2005 | Drury et al. | ......... | 707/3 |
| 2006/0218245 A1* | 9/2006 | Horn | ......... | 709/218 |
| 2006/0224608 A1* | 10/2006 | Zamir et al. | ......... | 707/101 |
| 2007/0250501 A1* | 10/2007 | Grubb et al. | ......... | 707/5 |
| 2007/0300166 A1* | 12/2007 | Ehret et al. | ......... | 715/760 |
| 2008/0140779 A1* | 6/2008 | Ahn et al. | ......... | 709/205 |
| 2008/0319944 A1* | 12/2008 | Venolia et al. | ......... | 707/3 |
| 2009/0012940 A1* | 1/2009 | Ives et al. | ......... | 707/3 |

OTHER PUBLICATIONS

Nathan, Google Reader Optimized, created Oct. 29 2006, http://userstyles.org/styles/1236.*

* cited by examiner

*Primary Examiner* — Neveen Abel Jalil
*Assistant Examiner* — Kevin L Young
(74) *Attorney, Agent, or Firm* — Seth H. Ostrow; Ostrow Kaufman LLP (57) ABSTRACT

The present invention is directed towards systems and methods for acting upon one or more items in a search results page. The method of the present invention comprises displaying a search engine results page (SERP), said SERP comprising a plurality of search result resources and a plurality of associated contextual controls, selecting a resource and storing a non-persistent resource identifier associated with the selected resource in response to selection of the contextual control.

30 Claims, 10 Drawing Sheets

SYSTEM AND METHOD FOR CONTEXTUAL COMMANDS IN A SEARCH RESULTS PAGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is related to the following pending application, which is hereby incorporated herein by reference in its entirety:

U.S. patent application Ser. No. 11/863,383, entitled "SYSTEM AND METHOD FOR PROVIDING SEARCH HISTORY IN A SEARCH RESULTS PAGE," filed Sep. 28, 2007.

FIELD OF THE INVENTION

The invention disclosed herein relates generally to maintaining a history of user interaction with content items available on a network. More specifically, the present invention is directed towards systems and methods for storing, displaying and modifying one or more lightweight contextual controls for presentation on a search results page.

BACKGROUND OF THE INVENTION

As the size of the Internet increases, the importance of Internet search engines increases proportionately, as can be seen by the increase market power held by search engine companies. Search engines single-handedly transform a mass of loosely collected digital resources into a manageable and navigable collection of organized data.

Although search engines have made great strides in indexing the vast amount of data on the Internet, additional attention needs to be focused on the interaction of the user with the search results. For example, users may currently bookmark a given webpage by manually saving a page to a local or remote bookmark file (which may be accessed by a plurality of users over a network), a user may share a webpage by manually copying a URL and sending the URL to a user, a user may mark a webpage by first viewing the webpage and relying on the browser to modify the color of a visited link, etc.

Thus, there is a need in the art for a systems, method and computer program products for providing contextual commands or controls, which may be provided in the context of a search results page.

SUMMARY OF THE INVENTION

Generally, embodiments of the present invention are directed towards systems, methods and computer program products for presenting contextual commands in a search results pages including, but not limited to, bookmarking commands, sharing commands and marking commands. One embodiment of the present invention is directed towards systems and methods for bookmarking a plurality of items on a search results page. The method of the present invention comprises displaying a search engine results page ("SERP"), the SERP comprising one or more search result resources (e.g., links to content items that are responsive to a given search) and one or more associated contextual controls. In one embodiment, a contextual control may comprise one or more of a save, share or mark control. According to one embodiment, a contextual control may be presented within a search history panel. In an alternative embodiment, contextual controls may be presented as a drop down menu. Still further, the contextual controls may be presented as a plurality of hyperlinks.

In response to a selection of a marking control, a resource identifier may be stored in a storage device, which may comprise a storage device in communication with the client device. In one embodiment, storing a resource identifier comprises storing a resource identifier in a SERP variable. In an alternative embodiment, storing a resource identifier comprises storing a resource identifier in a cookie. In one embodiment a resource identifier comprises a metadata structure comprising at least one URL and at least one URL title. The metadata structure may alternatively comprise a plurality of URLs.

The method may also comprise transmitting the resource identifier to at least one device. In one embodiment, transmitting comprises transmitting data via an instant messaging protocol. In an alternative embodiment, transmitting comprises transmitting data via e-mail. Other techniques for transmission are contemplated as falling within the scope of embodiments of the present invention.

In an alternative embodiment, a method may transmit at least one resource identifier to a content provider with a request for a second SERP and modifying a second SERP one the basis of the at least one resource identifier. Modifying the second SERP may comprise highlighting a search result matching a received resource identifier. In an alternative embodiment, modifying the second SERP may comprise presenting the at least one resource in addition to the search results. Finally, a second, modified SERP may be provided for display to an end user.

The present invention is further directed towards a system for providing contextual controls in conjunction with a plurality of items on a search results page. The system of the present invention comprises one or more client devices coupled to a network operative to display a SERP, the SERP comprising one or more search result resources and one or more associated contextual controls. In one embodiment, a contextual control may comprise a save, share or mark control. According various embodiments, a contextual control may be presented within a search history panel, as a drop down menu, as a plurality of hyperlinks, etc.

In response to a selection of a contextual control, a resource identifier may be stored in a storage device, which may include a storage device on the client device. In one embodiment, storing a resource identifier comprises storing a resource identifier in a SERP variable. In an alternative embodiment, storing a resource identifier comprises storing a resource identifier in a cookie. The resource identifier may comprise a metadata structure comprising at least one URL and at least one URL title. The metadata structure may alternatively comprise a plurality of URL descriptors.

In one embodiment, the system may further comprise transmitting said resource identifier to at least one device. In one embodiment, transmitting comprises transmitting data via an instant messaging protocol. In an alternative embodiment, transmitting comprises transmitting data via e-mail.

The system may comprise transmitting at least one resource identifier to a content provider with a request for a second SERP and modifying the second SERP on the basis of the at least one resource identifier. In one embodiment, modifying the second SERP comprises highlighting a search result matching a received resource identifier. In an alternative embodiment, modifying the second SERP comprises presenting the at least one resource in addition to the search results. Finally, a second, modified SERP may be provided and displayed to an end user.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
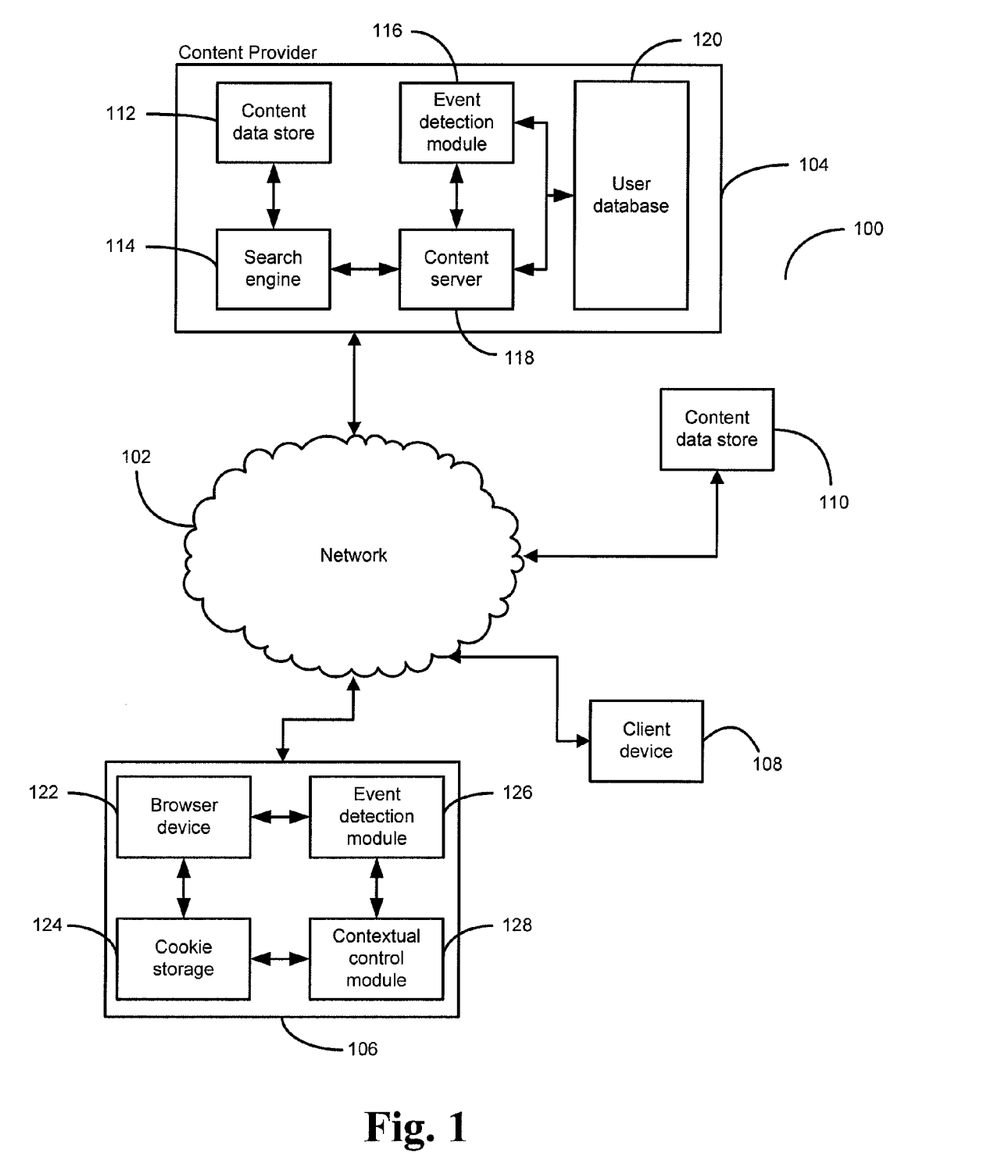
FIG. 1 presents a block diagram illustrating a system for providing contextual controls for one or more search results on a search engine results page according to one embodiment of the present invention.

FIG. 1 presents a block diagram illustrating a system for providing history content within a search result page according to one embodiment of the present invention. According to the embodiment that FIG. 1 illustrates, one or more client devices 106 and 108 are communicatively coupled to a network 102, which may include a connection to one or more local and wide area networks, such as the Internet. A plurality of content data stores 110 are further coupled to said network 102 and may provide data across the network 102 to one or more client devices 106, 108, as well as a content provider 104.

According to one embodiment of the invention, a given client device 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A client device 106, 108 may comprise a plurality of elements including, but not limited to, a browser application 122, cookie storage 124, event detection module 126 and contextual control module 128. A browser application 122 may comprise an application capable of requesting and receiving data from a plurality of content providers 104 via a transmission protocol, e.g., HyperText Transmission Protocol ("HTTP"). A browser application 122 may further be operable to receive resource (such as an HTML document) and display the received resource in a format viewable by a user of the client device. Additionally, a browser application 122 may be operable to execute transmitted program code in the form of JavaScript, Java or any other programming or scripting language operable to execute on a client device 106, 108.

A browser application 122 may be communicatively coupled to an event detection module 126 and cookie storage 124. A cookie storage 124 may comprise a storage device resident on client device 106, 108. Alternatively a cookie storage 124 may comprise a single file resident on a shared storage device, the shared storage device comprising a plurality of other data utilized by the client device 106, 108. In yet another embodiment, cookie storage 124 may comprise a folder resident on a disk drive containing a plurality of files corresponding to a plurality of distinct cookies.

An event detection module 126 may comprise software or hardware operative to detect user events in applications including, but not limited to, browser application 122. For example, event detection module 126 may comprise JavaScript program code operative to detect mouse or keyboard interactions with the browser application 122. In one embodiment, event detection module may detect user interaction with a search results page that a browser application 122 renders. For example, a search engine results page may comprise a plurality of "action words" such as "share", "save" or "mark" that the event detection module 126 monitors. In one embodiment, event detection module 126 detects a user event and transmits the received data to a second handling unit, such as contextual control module 128. According to alternative embodiments, event detection module 126 may handle events independently of any other modules on a client 106, 108.

A client device 106, 108 may further comprise a contextual control module 128 communicatively coupled to the event detection module 126 and cookie storage 124. Contextual control module 128 may receive data regarding user events from the browser application 122 via event detection module 126. For example, the contextual control module 128 may receive information that a user is selecting to bookmark an element resident on an HTML page rendered by browser application 122. The contextual control module 128 may format the received data into a second format and store the data within cookie storage 124 in accordance with the second format.

For example, a user may request a search results page for the search query "daft punk". In response, a search results page may be provided comprises a plurality of HTML hyperlinks, a given hyperlink followed by one or more actions words, such as "share", "save" or "mark". In accordance with one embodiment, a share link may indicate a desire by the user to share a particular link with a plurality of other users. A "save" link may indicate a desire by the user to save the particular link to a local or remote storage device. A "mark" link may indicate a desire by the user to mark the particular link as interesting and have the particular link marked on subsequent views, such as in subsequent searches. The "share", "save" and "mark" actions are described in greater detail with respect to FIGS. 2 through 4.

Continuing the present example, if a user selects a "save" function resident on a search results page, the event detection module 126 may detect the selection and extract data from the search results page related to the action. In one embodiment, event detection module 126 may extract at least one URL and at least one title of the selected content item, causing a URL and title of a hyperlink present on a search results page to be sent to the contextual control module 128. In an alternative embodiment, event detection module 126 may send a plurality of URLs and a plurality of corresponding titles to contextual control module 128. In this embodiment, the plurality of URLs and titles comprise a plurality of hyperlinks related to one another, such as by temporally or by subject matter. In this embodiment, the contextual control module 128 may reformat or condense the plurality of URLs and titles to generate metadata describing the received URLs and titles. In an alternative embodiment, an alphanumerical ID may be sent in place of the URL and title of a hyperlink. It should be noted by those of skill in the art that the use of URLs and titles is exemplary and the event detection module 126 may select other characteristics of a content item to which a search results page links.

The contextual control module 128 may be operative to store the received and formatted data within cookie storage 124. Data may be stored in cookie storage 124 as at least one name-value pair having the exemplary form "KEY=VALUE". For example, if a user bookmarks a hyperlink having an ID of 1234, a name-value pair "bm=1234;" maybe stored within cookie storage 124. The contextual control module 128 may further be operative to modify existing data within cookie storage 124. For example, the contextual control module 128 may be operative to appended newly selected items to an existing record within cookie storage 124. For example, a user may next bookmark a site having an ID of "5678". In this example, contextual control module 128 may be operative to append a string such as "5678;" to the existing bookmarking entry to form an entry comprising "bm=1234; 5678". Methods of creating and modifying client-based cookies are well-known in the art and it is noted that the examples provided above are not meant to comprise an exhaustive list of implementations.

System 100 may further comprise a content provider 104 that includes, but is not limited to, a content data store 112, search engine 114, event detection module 116, content server 118 and user database 120. Although illustrated as a single component 104, components 112, 114, 116, 118 and 120 may be located on a plurality of separate hardware components. Furthermore, individual components 112, 114, 116, 118 and 120 may be distributed across a number of distinct components and locations, as is known by those of skill in the art.

Content server 118 is operative to receive requests for data across network 102 and may comprise various hardware and software elements such as a plurality of rack mounted servers running HTTP servers such as Apache or IIS. Content server 118 may receive requests in the form of URL encoded query strings for processing by the search engine 114.

Search engine 114 may be operative to query the content data store 112 to return relevant search results for a given query. Search engine techniques are well known to those of skill in the art and are not discussed in the present application for clarity. The search engine 114 returns the search result set to content server 118, which in turn generates an HTML page containing the returned search results. The content server 118 may insert additional data into the search results page including, but not limited to, one or more action links within the HTML. These links include exemplary actions such as "share", "send" and "mark", wherein a given action link may be associated with an HTTP request, client side function call or server side function call.

Content server 118 may be further coupled to an event detection module 116 and a user database 120. The event detection module 116 and the user database 120 enable the content server 118 to dynamically customize the search result page before and after transmission to a given client device 106, 108. For example, the content server 118 may query the event detection module 116 to determine if a given element (e.g., link to a content item in the result set) of the search results page has been marked by the user. The event detection module 116 may retrieve this information from a cookie sent from a client device 106, 108. In an alternative embodiment, the event detection module 116 may store and access mark data from the user database 120.

If marked results are present on the search results page, the event detection module 116 may inform the content server 118 of the marked items. Content server 118 may perform a predetermined action on the marked items, such as highlighting the marked items. The event detection module 118, content server 118 and user database 120, may handle various other actions, which are described in greater detail herein with respect to FIGS. 2 through 4.

Figure 2:
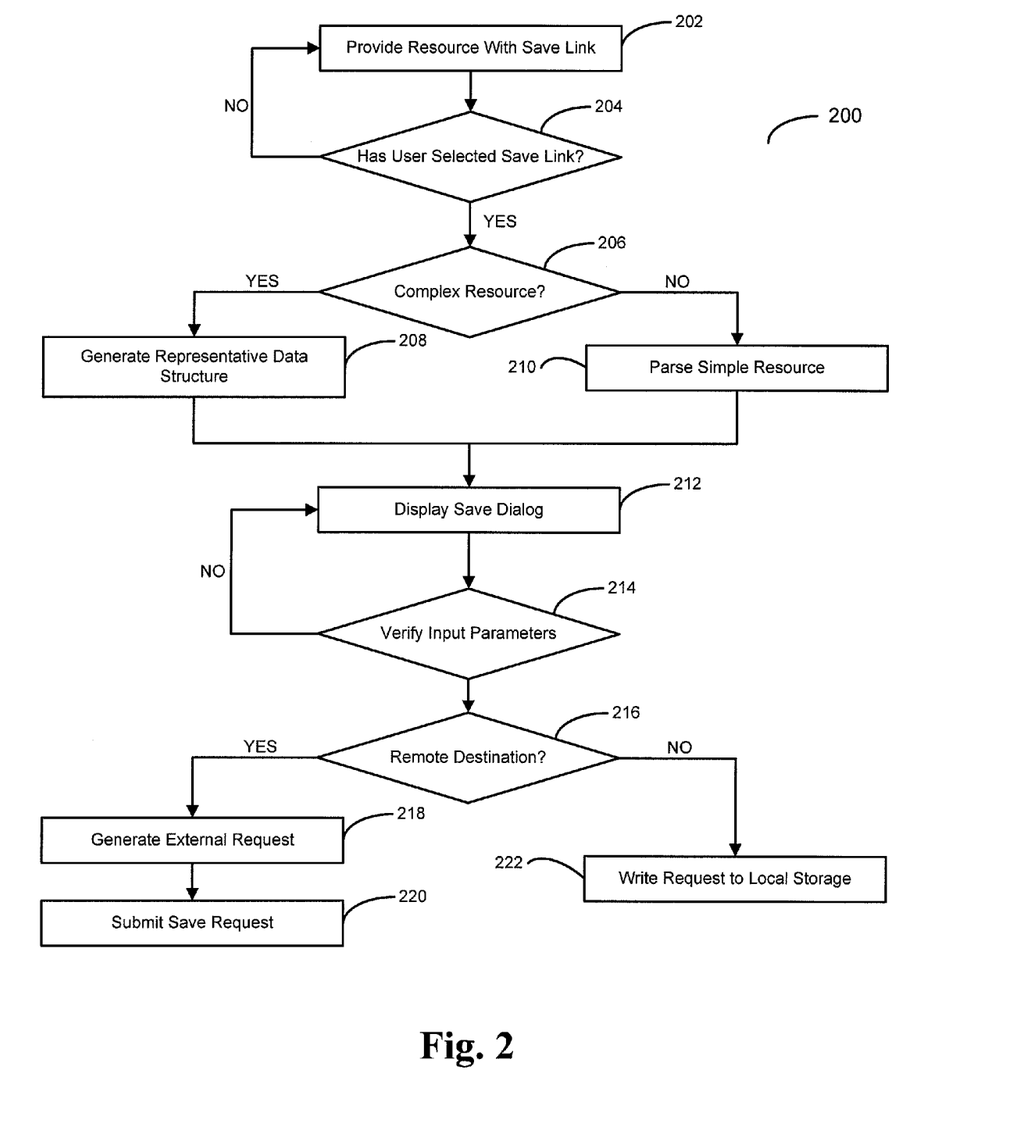
FIG. 2 presents a flow diagram illustrating a method for saving data related to a search engine results page according to one embodiment of the present invention.

FIG. 2 presents a flow diagram illustrating a method for saving data related to a content item presented on a search results page according to one embodiment of the present invention. The method 200 provides the user with a search results page that comprises a "save" link, step 202. In accordance with one embodiment, a save link may be provided in a history panel. The use and deployment of a history panel is more fully described in co-pending application Ser. No. 11/863,383, previously incorporated herein by reference in its entirety. In an alternative embodiment, a save link may be appended to the hyperlink text block as illustrated in Example 1.

EXAMPLE 1

```
1 <span class='link'>
2 <a href='http://www.daftpunk.com/'>Daft Punk</a>
3 <a href='javascript:void(0);' onclick='saveLink( )'>[ SAVE ]</a>
4 </span>
```

Figure 8:
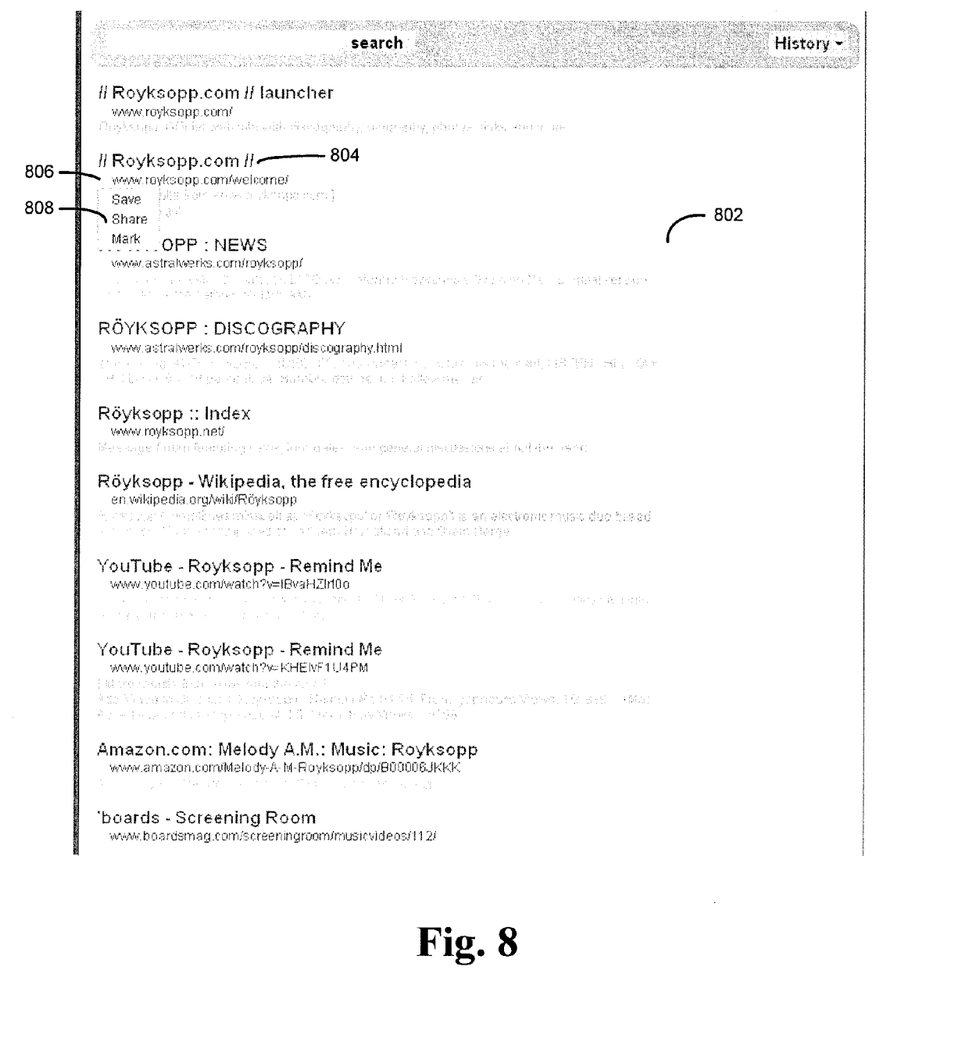

In another embodiment, the save link may be visible in a popup menu shown in response to a user action, such as clicking a button next to the hyperlink, as is illustrated with respect to FIG. 8.

A check is made to determine if a user selects the save link, step 204. If not, the link remains as it was provided in step 202. In one embodiment, a JavaScript event handler detects the selection of the save link. If the link is selected, a second check is made to determine if the selected resource is a complex or simple resource, step 206. A complex resource may comprise a plurality of hyperlinks organized by a predetermined characteristic, such as search keywords or search chronology. A simple resource may comprise a single hyperlink. Resources may comprise a single hyperlink or groups of hyperlinks.

If the resource is determined to be a complex resource, a representative data structure may be generated for the complex resource, step 208. A data structure may be any structure capable of fully describing the resource. For example, if a plurality of hyperlinks constitute a complex resource wherein hyperlinks are identified by a unique alphanumerical identifier, a structure may consist of a grouping ID along with the individual hyperlink IDs. For example, "nyc=1234; 5678; 91011;", illustrating three unique hyperlinks associated with a group "nyc". Alternatively, a group identifier may be appended to each individual hyperlink such as "1234nyc; 5678nyc; 91011nyc;". The previous examples illustrate two rudimentary data structures. Those of skill in the art, however, recognize that various other more complex data structures may be utilized in place of the above examples.

If the resource is determined to be a simple resource, such as a single hyperlink, the simple resource is parsed, step 210. For example, if a hyperlink containing a URL identified by an alphanumeric identifier such as "1234" is selected for saving, the identifier "1234" may be the only identifying item parsed from the URL of the hyperlink.

After the identifying information has been parsed from the selected item, a save dialog may be presented to the user, step 212. A save dialog may consist of an HTML panel comprising a plurality of input fields and buttons to allow a user to submit his or her request. In accordance with one embodiment, a save dialog may comprise a plurality of input fields enabling a user to enter various descriptive parameters such as a brief link description, link tags and a full link summary. Additionally, a plurality of hyperlinks, buttons or other similar controls may be provided to allow the user to select the destination of the save link. For example, a save dialog may allow a user to submit the save request to a remote server or to his or her local device.

Method 200 verifies that the one or more input parameters are correctly formatted, step 214. If the one or more input parameters are incorrectly formatted, the save dialog may be presented again, step 212. If the parameters are validated, a final check may be made to determine the destination of the save request, step 216.

As previously described, a save request may be made to a remote server or to the local client device. If the request is made for a remote site, an external request is generated, step 218. In one embodiment, an external request is generated on the basis of one or more input parameters entered by the user into the save dialog. For example, a JavaScript program may collect the input parameters and form a URL such as: http://www.yahoo.com/save?user=exampleUser&link=1234&desc=NY+Spurs&tags=spu rs; soccer&sum=Hompage+of+the+NY+Spurs+Supporters+Club. Alternatively, a cookie may store the query string parameters may for passing from the client device to the remote server.

After formulating a request, an external request may be made to transmit data from the client device, step 220. In one embodiment, submitting a save request is performed a synchronously, allowing the user to continue viewing the current search results page.

Figure 3:
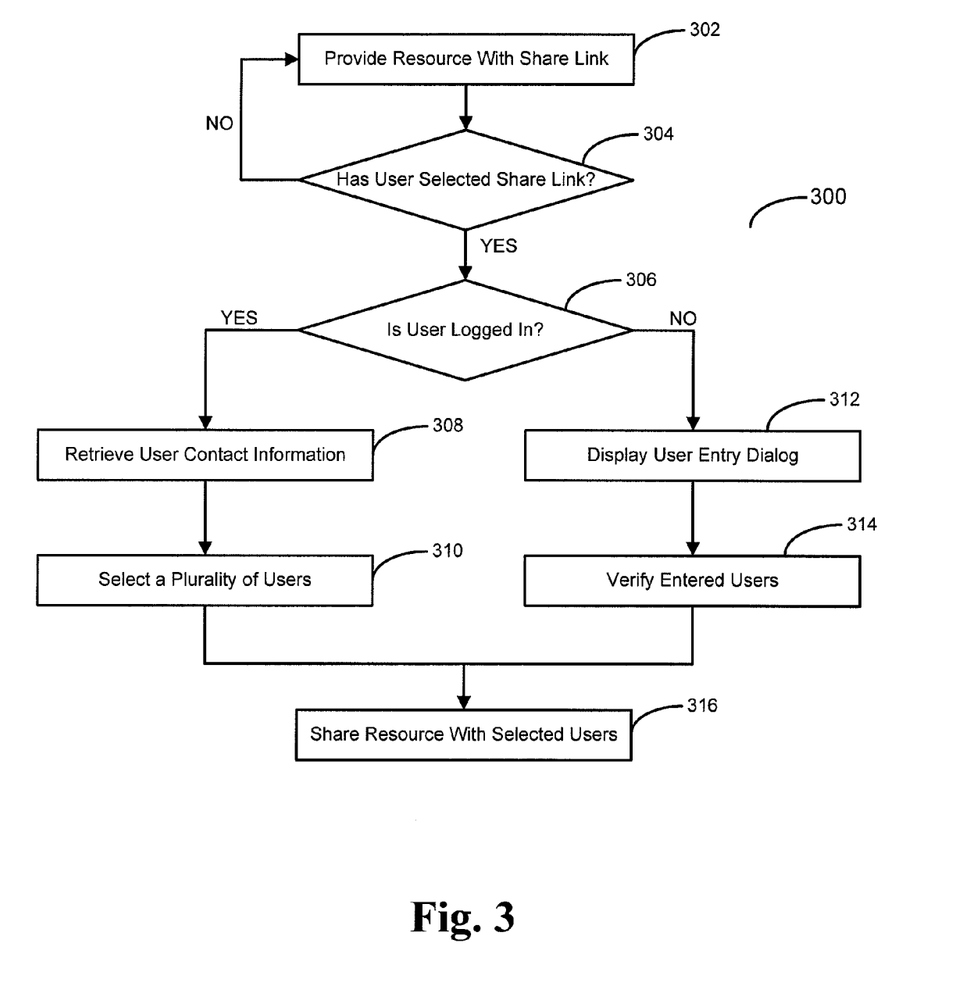
FIG. 3 presents a flow diagram illustrating a method for sharing data related to a search engine results page according to one embodiment of the present invention.

FIG. 3 presents a flow diagram illustrating a method for sharing data related to a content item presented on a search results page according to one embodiment of the present invention. The method 300 provides the user with a search results page that comprises a "share" link, step 302. In one embodiment, a share link may be provided in a history panel. In an alternative embodiment, a share link may be appended to the hyperlink text block as illustrated in Example 2.

| EXAMPLE 2 |
|---|
| 1 <span class='link'><br>2 <a href='http://www.daftpunk.com/'>Daft Punk</a><br>3 <a href='javascript:void(0);' onclick='shareLink( )'>[ SAVE ]</a><br>4 </span> |

In another embodiment, the share link may be visible in a popup menu shown in response to a user action, such as clicking a button next to the hyperlink, as is illustrated with respect to FIG. 8.

A check is made to determine if a user has selected the share link, step 304. If not, the link remains as provided in step 302. A JavaScript event handler may detect the selection of the share link. If the link is selected, a second check is made to determine if the user is logged in, step 306. In one embodiment, check 306 is implemented by checking for the presence of a cookie on the user device to determine if the server providing the share link authenticates the user.

If a user is logged in, contact information may be retrieved for the user, step 308. Contact information may correspond to one or more stored user contacts associated with a profile for the user. In one embodiment, stored user contacts may comprise one or more user names associated with a user in a "buddy list", such as a buddy list of an instant messaging service. In an alternative embodiment, stored user contacts may comprise a plurality of usernames and e-mail addresses stored in a user address book. Other sources of user contacts that may be utilized are well known to those of skill in the art.

After the user contact information is retrieved, step 308, one or more user contacts may be presented on the search results page (or in an ancillary window) and are selectable by the user, step 310. In accordance with one embodiment, a list of user contacts may be retrieved and presented on the existing search results page using asynchronous JavaScript techniques known to those of skill in the art. A contact panel may be displayed that enables a user to choose one or more contacts to share a resource with, e.g., through the use of drag and drop, selection boxes, etc.

If a user is not logged in, a user entry dialog may be presented in place of the contact panel, step 312. An entry dialog may comprise a plurality of input elements operative to receive contact information for contacts with which the user wishes to share the resource. Contacts may comprise instant messenger names, e-mail addresses or similar contacts. In lieu of, or in conjunction with the foregoing, a login panel may be displayed to the user in response to detecting the user is not logged in. The log in panel allows the user to enter login information (e.g., username and password) and enables a user to log in and retrieve stored contact information, step 308.

A user enters a plurality of contacts and a given entry is verified, step 314. For example, if a user enters a plurality of e-mail addresses, the e-mail addressed may be verified to be in a format of "user@domain.com". Alternatively, a user may enter a plurality of instant messenger usernames, wherein a check may be performed to determine if the instant messenger usernames are registered with a given instant messenger service. After the user enters and verifies one or more contacts, the selected resource is shared with the one or more users, step 316, e.g., via email.

Figure 4A:
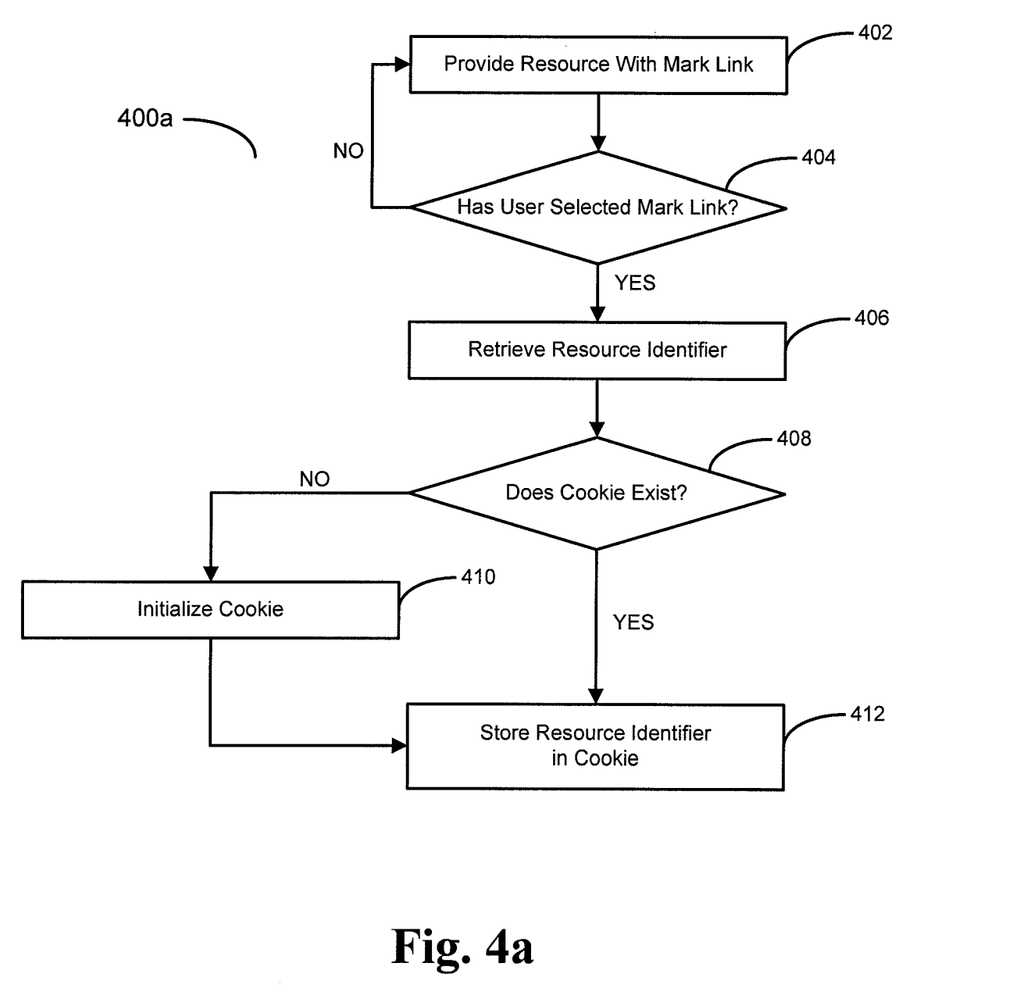
FIG. 4a presents a flow diagram illustrating a client-side method for marking data related to a search engine results page according to one embodiment of the present invention.

FIG. 4A presents a flow diagram illustrating a client-side method for marking data related to a content item presented on a search results page according to one embodiment of the present invention. The method 400 provides the user with a link to a resource or content item that contains or is associated with a "mark" link, step 402. A mark link may be provided in a history panel. In an alternative embodiment, a mark link may be appended to the hyperlink text block as illustrated in Example 3.

---

EXAMPLE 3

1 <span class='link'>
2 <a href='http://www.daftpunk.com/'>Daft Punk</a>
3 <a href='javascript:void(0);' onclick='markLink( )'>[ SAVE ]</a>
4 </span>

---

In another embodiment, the mark link may be visible in a popup menu shown in response to a user action, such as clicking a button next to the hyperlink, as is illustrated with respect to FIG. 8.

A check is made to determine if a user has selected the mark link, step 404. If not, the link remains as it was provided in step 402. A JavaScript event handler may detect the selection of the mark link. If the link is selected, a resource identifier corresponding to the selected resource is retrieved, step 406. A resource identifier may correspond to an alphanumeric identifier, although a resource identifier may comprise any data structure capable of sufficiently identifying a resource on a search results page, e.g., a URL.

The resource identifier is extracted and a check is made to determine if a cookie exists on the client device, step 408. A check for the cookie may comprise accessing a locally stored file to determine if a character string is present within the file. If a cookie is not present, one is initialized on the client device, step 410. Additionally, initializing a cookie may comprise storing an initial name/value pair in the cookie file.

If a cookie is found, or after a cookie is created, the fetched resource identifier is stored within the cookie for subsequent use, step 412. In accordance with one embodiment, storing a resource identifier may comprise storing a text string in the cookie which may be parsed during subsequent requests to a search engine server.

Figure 4B:
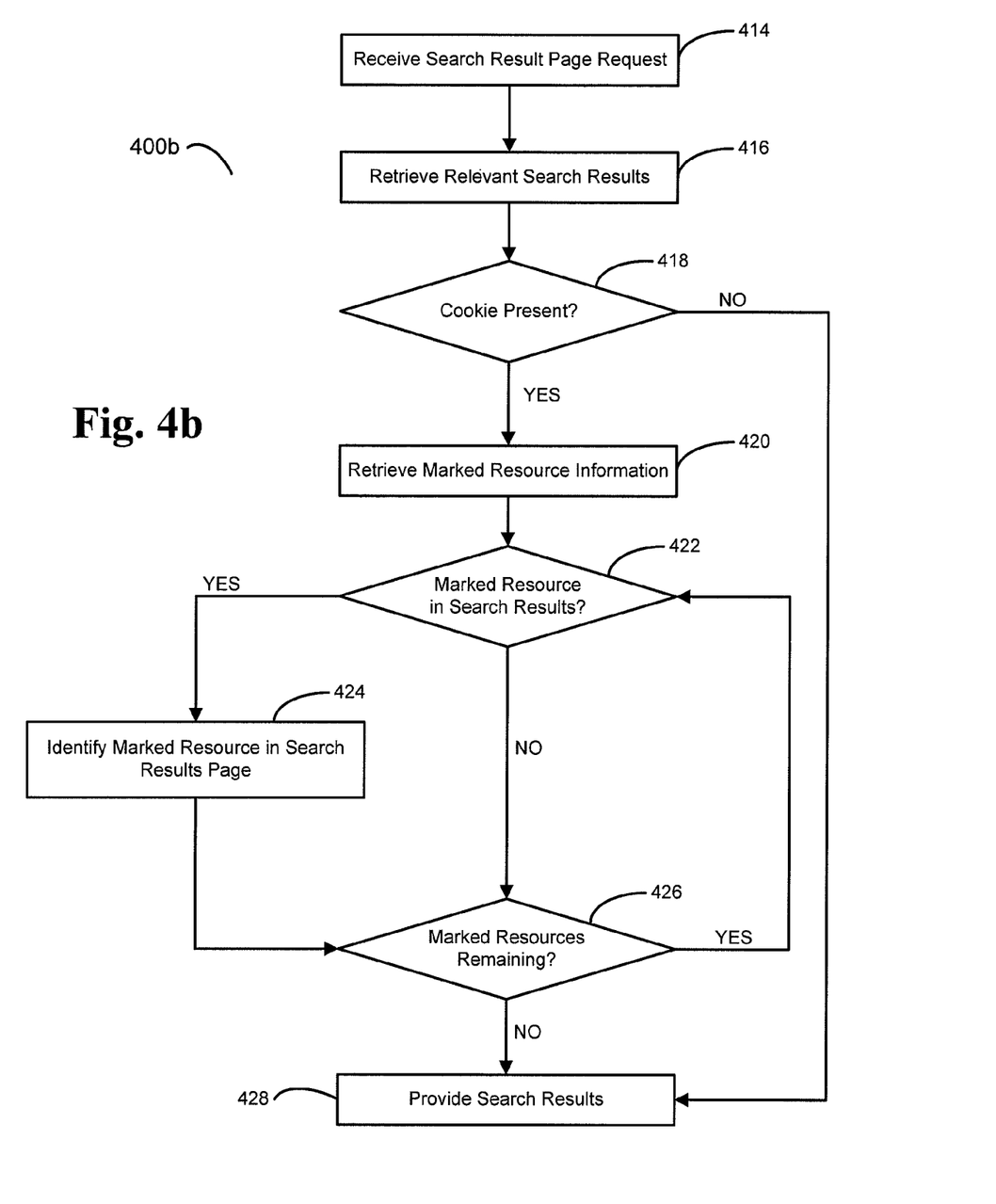
FIG. 4b presents a flow diagram illustrating a server-side method for marking data related to a search engine results page according to one embodiment of the present invention.

FIG. 4B presents a flow diagram illustrating a server-side method for marking data related to a content item presented on a search engine page according to one embodiment of the present invention. A search request is received, step 414. A search request may comprise an HTTP request comprising at least a query term. In response to a search request, a plurality of relevant search results are retrieved, step 416. The process of retrieving search results, such as through use of an indexing system, is well known to those of skill in the art and is not discussed for clarity.

A check is performed to determine if a cookie is present, step 418. As known in the art, a server side program may be operative to extract a received cookie present within the HTTP request and process data within the received cookie. If a cookie is not found by the server, the search results are provided to the user, step 428. Providing the search results to a user may comprise a plurality of formatting decisions such as determining the position of the results and the layout of the page. Additionally, a plurality of decisions may be made to determine whether and where additional content may be placed on the search results page. For example, a plurality of advertisements based upon the search query may be generated and combined with the search results to generate a final search results page.

If a cookie is present, information related to marked resources is retrieved from the cookie, step 420. As previously described, information related to marked resources may comprise one or more text strings indicating marked resources. For example, a cookie may contain the string "mark=1234#5678", which may indicated that resources identified as "1234" and "5678" are to be marked by the server. For given marked resource that the cookie identifies, a check is made to determine if the marked resource appears within the search results, step 422.

If a marked resource is found within the search results, the corresponding resource is marked on the search results page, step 424, which may comprise one or more HTML hyperlinks present in an HTML document. Identifying a marked resource in the search results page may comprise modifying the color of the marked resource. For example, modifying the color of an HTML hyperlink from a default color (such as blue) to a "marked color" (such as red). Alternatively, a resource may be boldly formatted, italic formatted, increase in size, decreased in size or any other formatting means operable to draw attention to the resource, indicated by a graphic or icon, etc. An in alternative embodiment, a plurality of marked resource may be presented in a formatted list along with the search results.

A check is performed to determine if additional resources are present within the retrieved search results, step 426. If so, the remaining marked resources are checked, step 422, and if found, marked, step 424. If not, the search results page comprising the marked resources is provided to the user, step 428.

Figure 5:
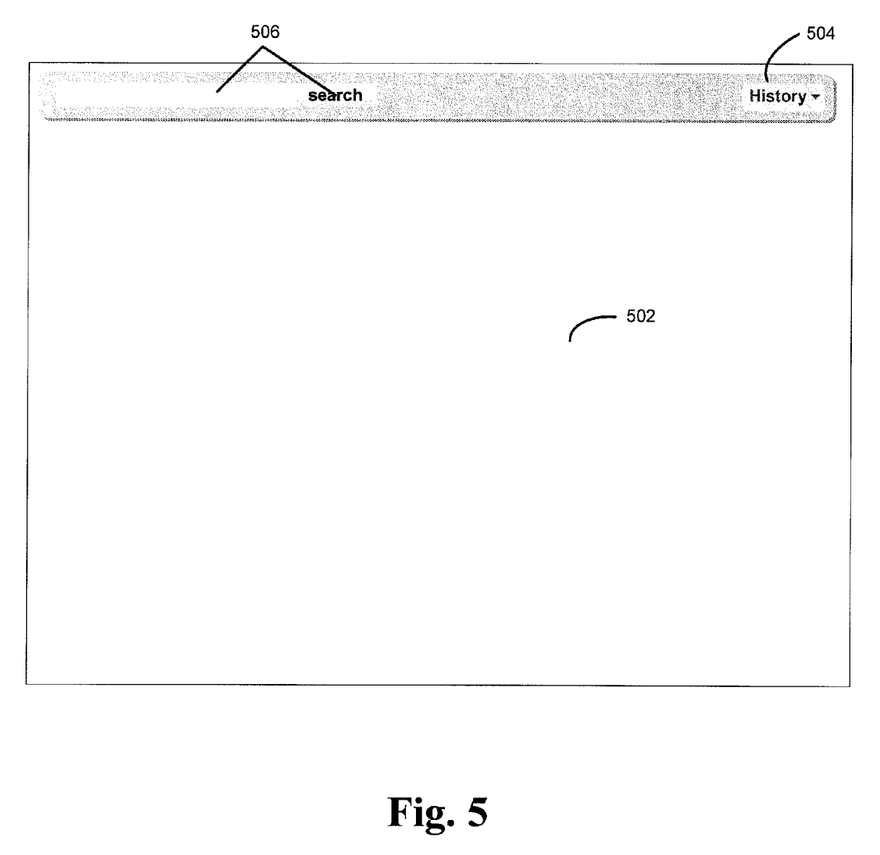
FIGS. 5 through 9 present screen diagrams illustrating interfaces for a contextual control on a search results page according to one embodiment of the present invention.

FIG. 5 presents a screen diagram illustrating a search engine start page. A search engine start page 502 may comprise a plurality of elements including a search form 506 and a history display button 504. In accordance with one embodiment, the start page 502, search form 506 and history display button 504 may comprise various combinations of HTML, CSS and JavaScript components utilized to render the elements on a user device. A search form 506 may be operative to receive a search query string from a user and enable the user to submit the search query to a search engine via an HTTP request. History display button 504 may be operative to display a list or set of one or more searched queries, as well as one or more selected search results.

Figure 6:
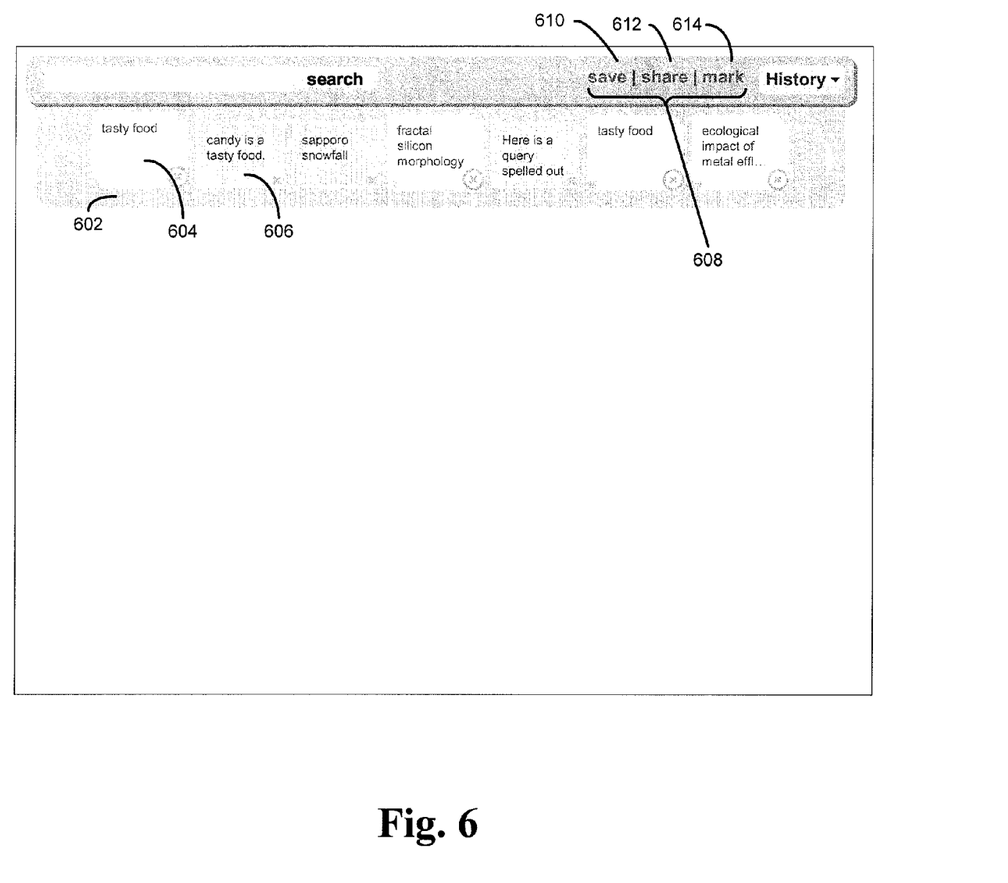

FIG. 6 presents a screen diagram illustrating a search results page comprising a history panel and a plurality of bookmarking links. A search results page may comprise a history panel 602 comprising a plurality of recent searches and recently selected search results 604 and 606. The contents of history panel 602 may be stored locally in a client-side storage device, such as a cookie. Alternatively, the history items 604 and 606 may be stored within JavaScript variables present on the search engine results page.

History panel 602 may comprise both complex resources 604 and simple resources 606. For example, a complex resource 604 may comprise a plurality or group search queries or selected query results. Conversely, a simple resource 606 may comprise a single search query or a single selected search result. A plurality of contextual control links 608 are presented on a search results page, with the exemplary contextual control links 608 comprising a save link 610, share link 612 and mark link 614. A user may select a resource located in history panel 602 and may select a given contextual control link 608 to perform a predetermined action, as is described with respect to FIGS. 7 through 9.

Figure 7:
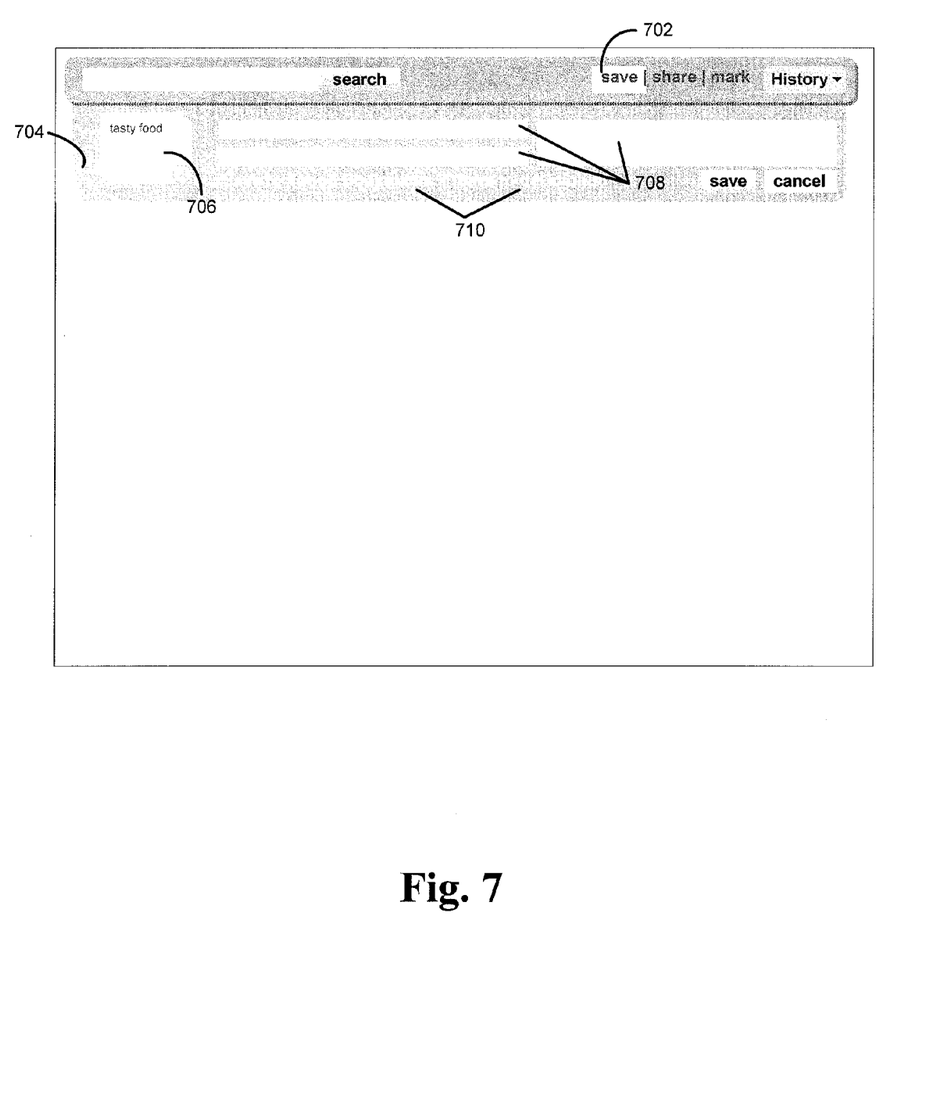

FIG. 7 presents a screen diagram illustrating a save dialog in accordance with a one embodiment of the present invention. In response to selecting a save link 702, a save dialog 704 may be presented to a user. A save dialog 704 may comprise a plurality of HTML elements presented in conjunction with a dialog comprising a plurality of input elements.

According to the present embodiment, a save dialog 104 may comprise a resource 706, one or more input elements to receive metadata 708 and one or more submission links 710. A resource 706 may be an iconic representation of the content item the user is requesting to be saved as previously described. Metadata input elements 708 allow a user to enter descriptive information regarding the resource. For example, a user may enter a title, description and descriptive keywords describing the particular resource. Alternatively, at least one of the items of metadata may be automatically filled on the basis of characteristics of the resource, or further alternatively, by retrieving data associated with a selected resource from a remote resource database.

Save dialog 704 also provides a plurality of save options 710. In the present embodiment, a user may have the option to save the resource to a bookmark database (e.g., "Save to Yahoo Bookmarks") or to another third party bookmarking service (e.g., "Save to del.icio.us").

FIG. 8 presents a screen diagram illustrating an alternative embodiment for displaying a plurality of bookmarking links. According to FIG. 8, a search results page 802 comprises one or more hyperlinked search results 804. Located next to a given hyperlink 804 is a contextual control icon 806. A contextual control icon 806 may comprise a resource that, when selected, displays a contextual control dialog 808.

Contextual control dialog 808 may comprise one or more HTML and JavaScript elements operative to perform bookmarking actions in response to user interaction. As illustrated, the selection of a contextual control icon 806 allows a search results page 802 to be displayed with minimal interference of bookmarking features. In response to user interaction with a contextual control dialog 808 (such as selecting a mark function), a request may be sent to a search engine comprising one or more bookmarking parameters. Additionally, a client-side JavaScript program may store bookmarking data locally in a data structure such as a cookie. For example, if a user selects the "mark" option from contextual control dialog 808, data may be written to a client-side cookie and subsequently returned to the search engine server for processing, as described with respect to FIGS. 4a and 4b.

Figure 9:
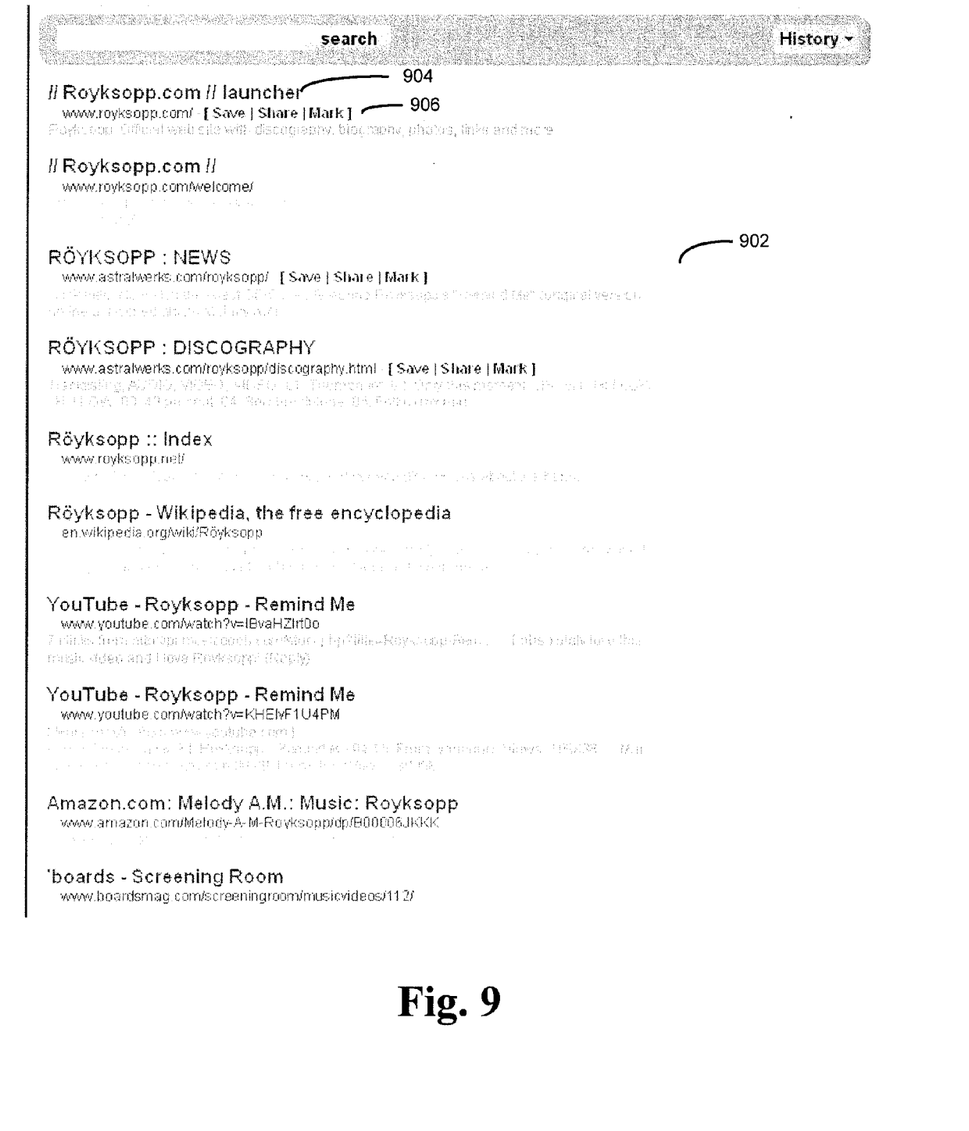

FIG. 9 presents a screen diagram illustrating an alternative embodiment for displaying a plurality of bookmarking links. As FIG. 9 illustrates, a search results page 902 comprises one or more hyperlinks to search results 904. Adjacent to a given hyperlinked search result 904 is a plurality of contextual control links 906. The presented contextual control links 906 ("save", "share", "mark") may perform the methods of previously presented FIGS. 2 through 4, respectively. In response to user interaction with the contextual control links 906 (such as selecting a mark function), a request may be sent to a search engine server comprising a plurality of bookmarking parameters. Additionally, a client-side JavaScript program may store bookmarking data locally in a data structure such as a cookie. For example, if a user selects the "mark" option from the contextual control links 906, data may be written to a client-side cookie and subsequently returned to the search engine server for processing, as described with respect to FIGS. 4a and 4b.

FIGS. 1 through 9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A method for acting upon one or more items in a search results page, the method comprising:

receiving a search query from a search engine interface;

determining, in response to the search query, a plurality of search results indicating search result resources;

providing a first search engine results page a first search engine results page ("SERP"), the first SERP including a list of one or more of the search result resources and a plurality of contextual controls displayed adjacent to each of the search result resources on the list, the contextual controls including marking, saving, and sharing the one or more of the search result resources;

receiving a user selection of the one or more of the search result resources;

appending to any existing link identifiers one or more link identifiers associated with one or more of the search result resources;

generating a non-persistent resource identifier associated with the appended one or more link identifiers in response to selection of the one or more of the search result resources;

receiving a request for a second SERP, the second SERP including the selected one or more of the search result resources;

identifying the one or more link identifiers associated with the one or more of the search result resource from the resource identifier; and modifying the second SERP on the basis of the resource identifier, the modification of the second SERP indicating a marking, saving, or sharing of the selected one or more of the search result resources.

2. The method of claim 1 wherein the storing comprises storing a resource identifier in a SERP variable.

3. The method of claim 1 comprising transmitting the resource identifier to at least one device.

4. The method of claim 3 wherein transmitting comprises transmitting data via an instant messaging protocol.

5. The method of claim 3 wherein transmitting comprises transmitting data via e-mail.

6. The method of claim 3 wherein the device comprises a content server operative to store the resource identifier in a persistent storage device.

7. The method of claim 1 comprising presenting the contextual control within a search history panel.

8. The method of claim 1 comprising presenting the contextual control as a drop down menu.

9. The method of claim 1 comprising presenting contextual control as a plurality of hyperlinks.

10. The method of claim 1 wherein said resource identifier comprises a metadata structure comprising at least one URL and at least one URL title.

11. The method of claim 10 wherein said metadata structure further comprises a plurality of URL descriptors.

12. A system for affecting one or more items in a search results page, the system comprising:

a content provider, the content provider comprising a memory and processor, coupled to a client device via a network, the content provider configured to:

generate a first search engine results page based on receiving a search query from a search engine interface and determining, in response to the search query, a plurality of search results indicating search result resources, the first search engine results page including a list of one or more of the search result resources and one or more contextual controls displayed adjacent to each of the search result resources on the list, the contextual controls including marking, saving, and sharing the one or more of the search result resources;

generate a non-persistent resource identifier associated with a selection of the one or more of the search result resources in response to a selection of contextual control to mark, save, or share the selected one or more of the search result resources, the non-persistent resource identifier includes appending to any existing link identifiers one or more link identifiers associated with the one or more of the search result resources;

receive a request for a second search engine results page, the second search engine results page including the selected one or more of the search result resources;

retrieve the resources identifier associated with the one or more of the search result resources from the resource identifier; and modify the second search engine results page on the basis of the resource identifier, the modification of the second search engine results indicating a marking, saving, or sharing of the selected one or more of the search result resources.

13. The system of claim 12 wherein the resource identifier is stored in a SERF variable.

14. The system of claim 12 wherein the client device is operative to transmit the resource identifier to at least one device.

15. The system of claim 14 wherein said the content server comprises a content server operative to store the resource identifier on a persistent storage device.

16. The system of claim 12 wherein the contextual control is presented within a search history panel.

17. The system of claim 12 wherein the contextual control is presented as a drop down menu.

18. The system of claim 12 wherein the contextual control is presented as a plurality of hyperlinks.

19. The system of claim 12 wherein the one or more of the search result resources comprises a metadata structure comprising at least one URL and at least one URL title.

20. The system of claim 19 wherein the metadata structure comprises a plurality of URL descriptors.

21. Non-transitory computer readable media comprising program code for execution by a programmable processor that instructs the processor to perform a method for acting upon one or more items in a search results page, the computer readable media comprising:

program code for receiving a search query;

program code for providing a first search engine results pave ("SERP"), the first SERP including a list of one or more of the search result resources and a plurality of contextual controls displayed adjacent to each of the search result resources on the list, the contextual controls including marking, saving, and sharing the one or more of the search result resources;

program code for receiving a user selection of the one or more of the search result resources;

program code for receiving a user selection of the one or more of the search result resources;

program code for appending to any existing link identifiers one or more link identifiers associated with the one or more of the search result resources;

program code for generating a non-persistent resource identifier associated with the appended one or more link identifiers in a response to selection of the contextual control to mark, save, or share the user selection of the one or more of the search result resources;

program code for receiving a request for a second SERP, the second SERP including the selected one or more of the search result resources;

program code for retrieving the resource identifier associated with the selected one or more of the search result resources;

program code for identifying the one or more link identifiers associated with the one or more of the search result resources from the resource identifier; and program code for modifying the second SERP on the basis of the resource identifier, the modification of the second SERP indicating a marking, saving, or sharing of the selected one or more of the search result resources.

22. The computer readable media of claim 21 wherein the program code for storing comprises program code for storing a resource identifier in a SERP variable.

23. The computer readable media of claim 21 comprising program code for transmitting the resource identifier to at least one device.

24. The computer readable media of claim 21 comprising program code for presenting the contextual control within a search history panel.

25. The computer readable media of claim 21 comprising program code for presenting the contextual control as a drop down menu.

26. The system of claim 14 wherein the client device transmits the data via an instant messaging protocol.

27. The system of claim 14 wherein the client device transmits the data via e-mail.

28. The computer readable media of claim 23 wherein program code for transmitting comprises program code for transmitting data via an instant messaging protocol.

29. The computer readable media of claim 23 wherein program code for transmitting comprises program code for transmitting data via e-mail.

30. The computer readable media of claim 21 comprising program code for presenting contextual control as a plurality of hyperlinks.

* * * * *